United States Patent
Guest

(10) Patent No.: US 7,082,957 B2
(45) Date of Patent: Aug. 1, 2006

(54) TEMPORARY CLOSURE DEVICES AND TUBE COUPLINGS INCORPORATING SUCH DEVICES

(75) Inventor: John Derek Guest, Maidenhead (GB)

(73) Assignee: John Guest International Limited, Middlesex (GB)

( * ) Notice: Subject to any disclaimer, the term of this patent is extended or adjusted under 35 U.S.C. 154(b) by 324 days.

(21) Appl. No.: 10/688,360

(22) Filed: Oct. 17, 2003

(65) Prior Publication Data

US 2004/0084107 A1 May 6, 2004

(30) Foreign Application Priority Data

Oct. 24, 2002 (GB) ................................ 0224785.6

(51) Int. Cl.
*F16L 37/38* (2006.01)
(52) U.S. Cl. ................. 137/68.19; 137/68.11; 251/149.1; 285/3
(58) Field of Classification Search .................. 137/67, 137/68.11, 68.19; 222/541.1; 251/149, 251/149.1; 285/3
See application file for complete search history.

(56) References Cited

U.S. PATENT DOCUMENTS

| | | | |
|---|---|---|---|
| 1,933,117 A * | 10/1933 | Markle | 285/3 |
| 3,685,795 A | 8/1972 | Caster | |
| 4,181,140 A | 1/1980 | Bayham et al. | |
| 4,269,237 A | 5/1981 | Berger | |
| 4,469,249 A | 9/1984 | Malpas et al. | |
| 4,610,469 A * | 9/1986 | Wolff-Mooij | 285/260 |
| 5,468,027 A * | 11/1995 | Guest | 285/319 |
| 5,544,858 A * | 8/1996 | Rogers et al. | 251/149.6 |
| 2003/0230340 A1 * | 12/2003 | Anderson et al. | 137/68.11 |

FOREIGN PATENT DOCUMENTS

| | | |
|---|---|---|
| EP | 0 829 671 B1 | 3/1996 |
| GB | 2 020 253 A | 11/1979 |
| GB | 2 182 320 A | 5/1987 |
| GB | 2 297 081 A | 7/1996 |
| GB | 2 341 852 A * | 3/2000 |
| WO | WO 98/28566 | 7/1998 |

* cited by examiner

*Primary Examiner*—Ramesh Krishnamurthy
(74) *Attorney, Agent, or Firm*—Workman Nydegger

(57) ABSTRACT

The disclosure relates to a temporary closure device for a throughway comprises a sleeve to fit in the throughway and a core located in the sleeve. The core has an annular rupturable connection locating the core in the sleeve to prevent flow of fluids through the sleeve. The annular connection is rupturable by displacing the core axially in the sleeve to allow fluid to flow through the sleeve.

19 Claims, 6 Drawing Sheets

TEMPORARY CLOSURE DEVICES AND TUBE COUPLINGS INCORPORATING SUCH DEVICES

BACKGROUND TO THE INVENTION

1. Field of the Invention

This invention relates to temporary closure devices suitable for use in tube couplings and also to tube couplings incorporating temporary closure devices.

2. Background Prior Art

U.S. Pat. No. 4,269,237 discloses a device for draining and collecting sump oil from a motor vehicle having a drain plug which is closed by a ball valve or rupturable membrane. Oil is drained from the sump by inserting a drain spigot into the plug body to open the valve or to rupture the membrane so that oil drains through a hose connected to the spigot into a shallow vessel which may be located beneath the vehicle.

British Patent Specification No. 2182320 discloses a keystone bung and a cask connector for beverage casks. The bung has an outer periphery constructed to seal with a given keystone and a through bore closed by a sealing diaphragm. The through bore has an internal screw thread to mate with an external thread on the cask connector so that it can be screwed into the through bore and a tapered inner end of the connector can rupture the diaphragm to open the bung.

Summary of the Invention

This invention provides a temporary closure device for a throughway comprising a sleeve to fit in the throughway and a core located in the sleeve, the core having an encircling annular rupturable connection locating the core in the sleeve to prevent flow of fluids through the sleeve, the annular connection being rupturable by displacing the core axially in the sleeve to allow fluid to flow through the sleeve.

More specifically, the annular rupturable connection is formed by an annular web extending between the core and the sleeve.

Thus, in one arrangement according to the invention the web may be formed integrally with the core and has a rupturable connection with the sleeve.

For example, the annular web may be formed integrally with both the core and the sleeve, the connection between the web and the sleeve being rupturable to permit the core to move axially in the sleeve to allow flow through the sleeve.

In a further arrangement, the annular web may be bonded to the sleeve, the bond being rupturable to permit the core to move axially in the sleeve to allow flow through the sleeve.

In a still further arrangement, the throughway in the sleeve may have annular abutment means with which the web engages to locate the core in the sleeve and from which the web can be disengaged by pressing the core into the throughway to allow flow of fluid along the throughway.

In any of the above arrangement the sleeve may be an elongate sleeve having a front portion in which the core is located and a rear portion to which the core may be displaced to allow flow of fluid through the sleeve.

In the latter arrangement the rear portion of the sleeve may be formed with one or more axially extending slots in the wall of the sleeve through which fluid may flow when the core is located in the rear of the sleeve.

More specifically, a plurality of slots may be formed in the rear portion of the sleeve equispaced around the sleeve.

In the case where an elongate sleeve is provided and the core is moulded in the front portion of the sleeve, the core may have an end projecting from the front end of the sleeve with which a tube or other component can act to displace the core into the sleeve to open the passage through the sleeve. The projecting end of the core may taper from the integral annular web to the front of the core. Also, the front of the core may have an integral projecting cruciform shape to receive a tube or other component to displace the core.

In any of the above arrangements the sleeve and core may be moulded plastics components.

The invention also provides a tube coupling body having a throughway open at one end to receive a tube, a locking device in the throughway to engage and secure the tube in the throughway, a seal in the throughway beyond the locking device to engage and seal with the tube when the latter is fully inserted into the throughway and is engaged by the locking device and a closure device located in the throughway beyond the seal to be engaged by the tube as the latter is inserted into the throughway, the closure device incorporating a rupturable seal arranged to be ruptured by full insertion of the tube or pin to permit flow in the throughway.

The closure device may comprise a sleeve to be engaged in the throughway, a core located in the sleeve with a rupturable seal extending between the plug and sleeve, the plug being engaged by a tube or pin inserted into the throughway to rupture the seal with the sleeve and displace the plug along the sleeve to allow flow through the sleeve.

In the latter construction the closure device may comprise a sleeve and a core located in the sleeve, the sleeve having a front portion and a rear portion, the plug being located in and supported in the front portion of the sleeve by a thin breakable annular web formed integrally between the core and sleeve to prevent flow of fluids through the sleeve, the core being possibly displaceable into the rear portion of the sleeve and the rear portion of the sleeve having a passage or passages therein to permit flow of fluid passed the core when located in the rear portion.

More specifically, the rear portion of the sleeve may be formed with one or more axially extending slots in the wall of the sleeve through which fluid may flow when the core is located in the rear of the sleeve.

In one example according to the invention, a plurality of slots may be formed in the rear portion of the sleeve equispaced around the sleeve for fluid flow when the core is displaced into the rear portion of the sleeve.

In accordance with a further feature of the invention the core may be moulded in the front portion of the sleeve and may have an end projecting from the front end of the sleeve on which a tube or other component can act to displace the core into the sleeve to open the passage through the sleeve. Furthermore, the projecting end of the core may taper from the integral annular web to the front of the core and the front of the core may have an integral projecting cruciform shape to receive a tube or other component to displace the core.

BRIEF DESCRIPTION OF THE DRAWINGS

The following is a description of some specific embodiments of the invention, reference being made to the accompanying drawings in which.

DESCRIPTION OF THE PREFERRED EMBODIMENTS

Figure 1:
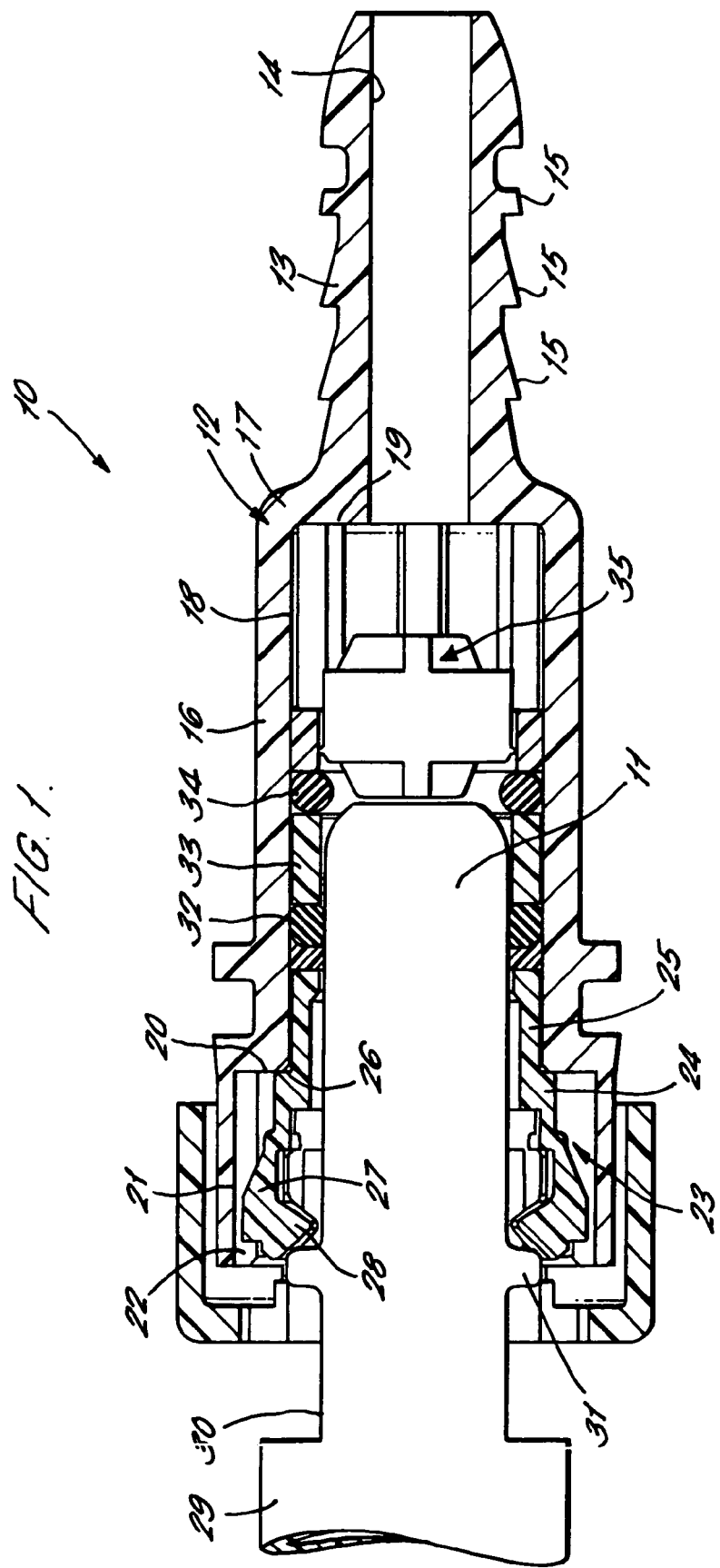
FIG. 1 is a partially cross-sectioned view of a tube coupling with an end part of a tube inserted partway into the coupling and a closure device located in the coupling in a closed condition.

Referring firstly to FIG. 1 of the drawings, there is shown a tube coupling indicated generally at 10 and an end portion indicated at 11 of a tube which is inserted partway into the coupling. The tube coupling is generally of the type described and illustrated in my European Patent No. 829671 to which reference should be made for a detailed description of the coupling.

The coupling comprises a coupling body indicated generally at 12 comprising a short spigot 13 having a central throughway 14 and external annular ribbing 15 to engage and grip in a soft walled tube (not shown). The spigot of the coupling body leads into an enlarged diameter socket 16 having a bottom wall 17 with which the spigot is integrally formed. The throughway 14 in the spigot opens into an increased diameter bore 18 in the socket at an internal annular step 19 at the bottom of the socket facing outwardly of the socket. The socket has a further stepped increase in bore at 20 from which an enlarged diameter end portion extends to terminate in an open end 22 to the coupling body.

A collet indicated generally at 23 for locking a tube in the coupling body is mounted in the socket adjacent the open end thereof. The collet comprises an annular skirt 24 having a stepped outer surface formed with reduced diameter portion 25 at a step 26 which engages in the stepped bore 18 with the step 26 abutting the step 20. The skirt 24 has a plurality of resilient arms 27 projecting towards the open end of the socket and is formed with inturned abutment teeth 28 to engage with a tube inserted into the coupling body.

A tube to engage in the coupling body is indicated at 29. The tube has a reduced diameter end portion 30 which projects into the socket of the coupling body through the open end 22, and has an integral encircling annular bead 31 with which the teeth 28 on the collet engage as the tube is inserted into the socket. As shown in FIG. 1, the tube is partially inserted into the socket and the bead 31 is in engagement with the outer sides of teeth 28 of the collet.

The bore 18 of the socket 16 contains, further along from the collet 24, a first O-ring seal 32 to engage with the outer surface of the tube inserted into the socket, a spacer 33 and further O-ring seal 34 and finally a closure device indicated generally at 35.

The detailed construction of the closure device is shown in FIGS. 3 to 6 to which reference will now be made. The closure device comprises a sleeve 37 having a stepped bore the sleeve having a forward portion 38 in which the larger diameter bore is formed containing a slightly small diameter portion bore and a rear portion 39. The sleeve is located between the second O-ring seal 34 in the socket and shoulder 19 where the socket reduces in diameter to the spigot 13. The front portion of sleeve 38 contains a core comprising a central cylindrical portion 40 which is smaller in diameter than the internal diameter of the sleeve 38 to leave a gap 41 between the core and forward portion of the sleeve. The core is located in the sleeve by means of an annular web 43 of triangular cross-section formed integrally with the core and tapering to a apex formed integrally with the inner surface of the sleeve. The connection between the apex of the web and the inner surface of the sleeve is rupturable to release the core from the sleeve as will be described later.

The core has a frusto-conical portion 42 extending from the web 43 outwardly of the sleeve and to terminate in a projecting cross or cruciform abutment 44 at the forward end of the core. The opposite, rearward end of the core is formed with a similar cruciform projection 45. The core is a close fit in the rear near portion 39 of the sleeve which has a plurality of slots 46 extending into the sleeve from the rearward end to allow flow of fluid around the core.

Figure 2:
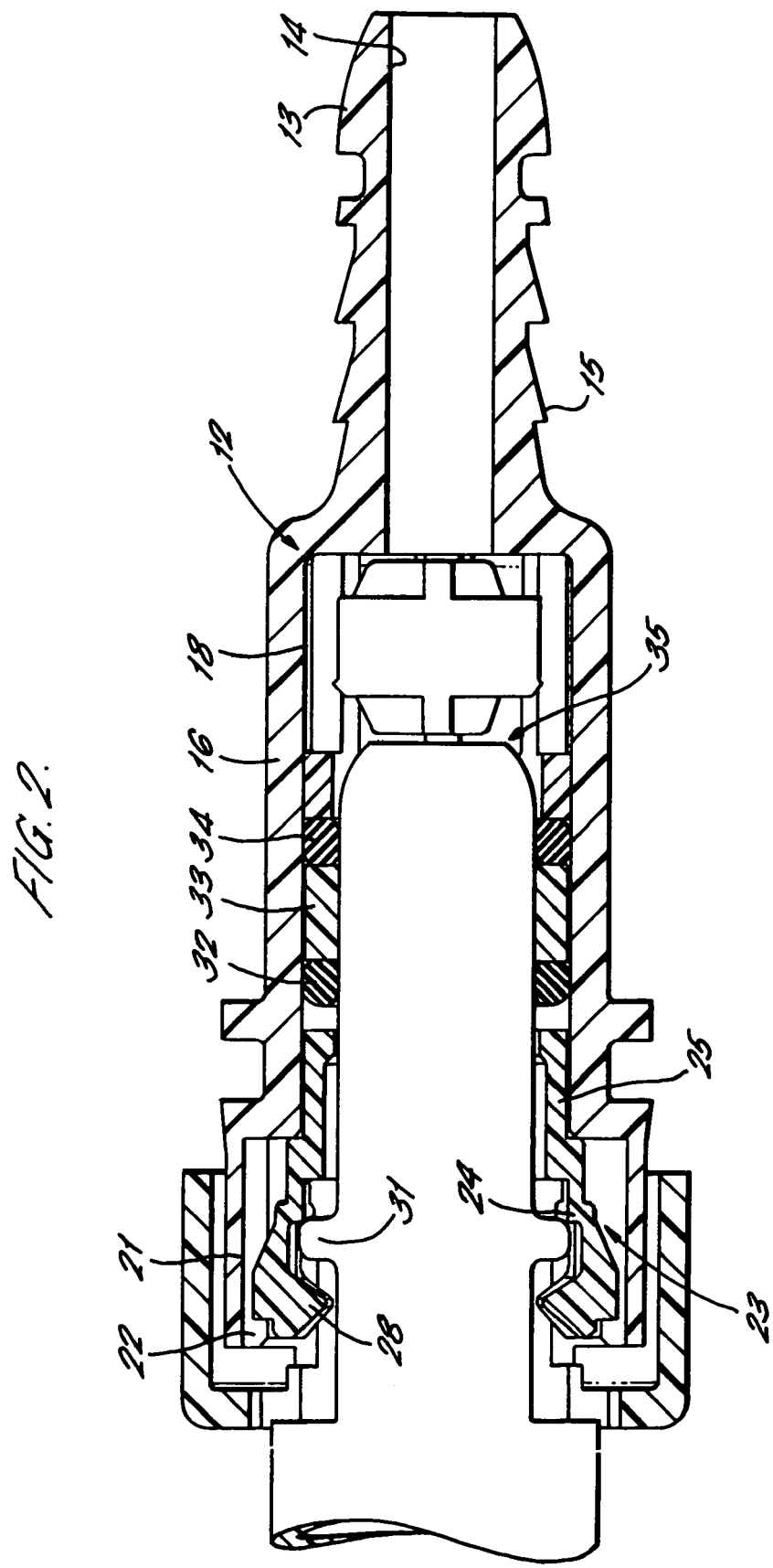
FIG. 2 is a similar view to FIG. 1 with the tube end fully inserted into the coupling and the closure device in the open condition.
Figure 3:
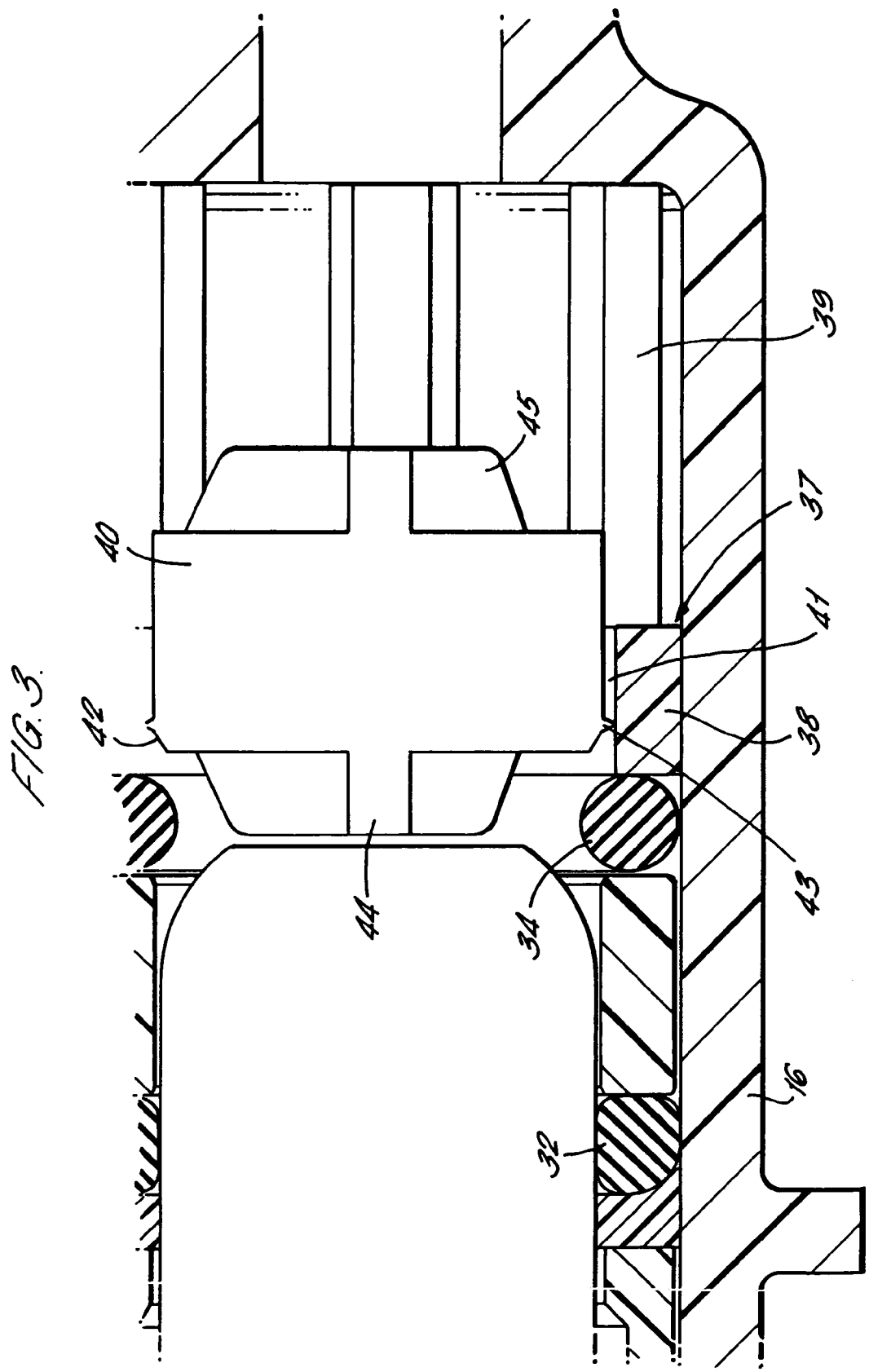
FIG. 3 is an enlarged view of part of the coupling, part of the end portion of the tube and the closure device shown in FIG. 1.
Figure 4:
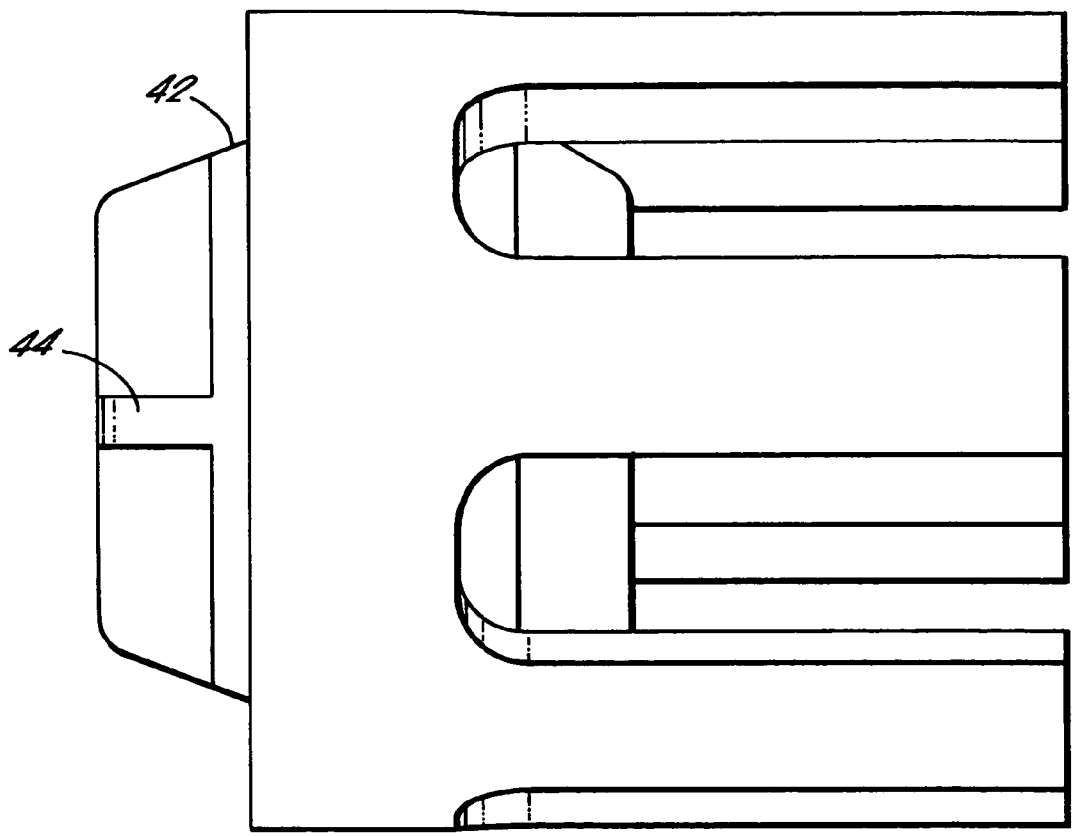
FIG. 4 is an elevation view of the closure device out of the tube coupling.
Figure 5:
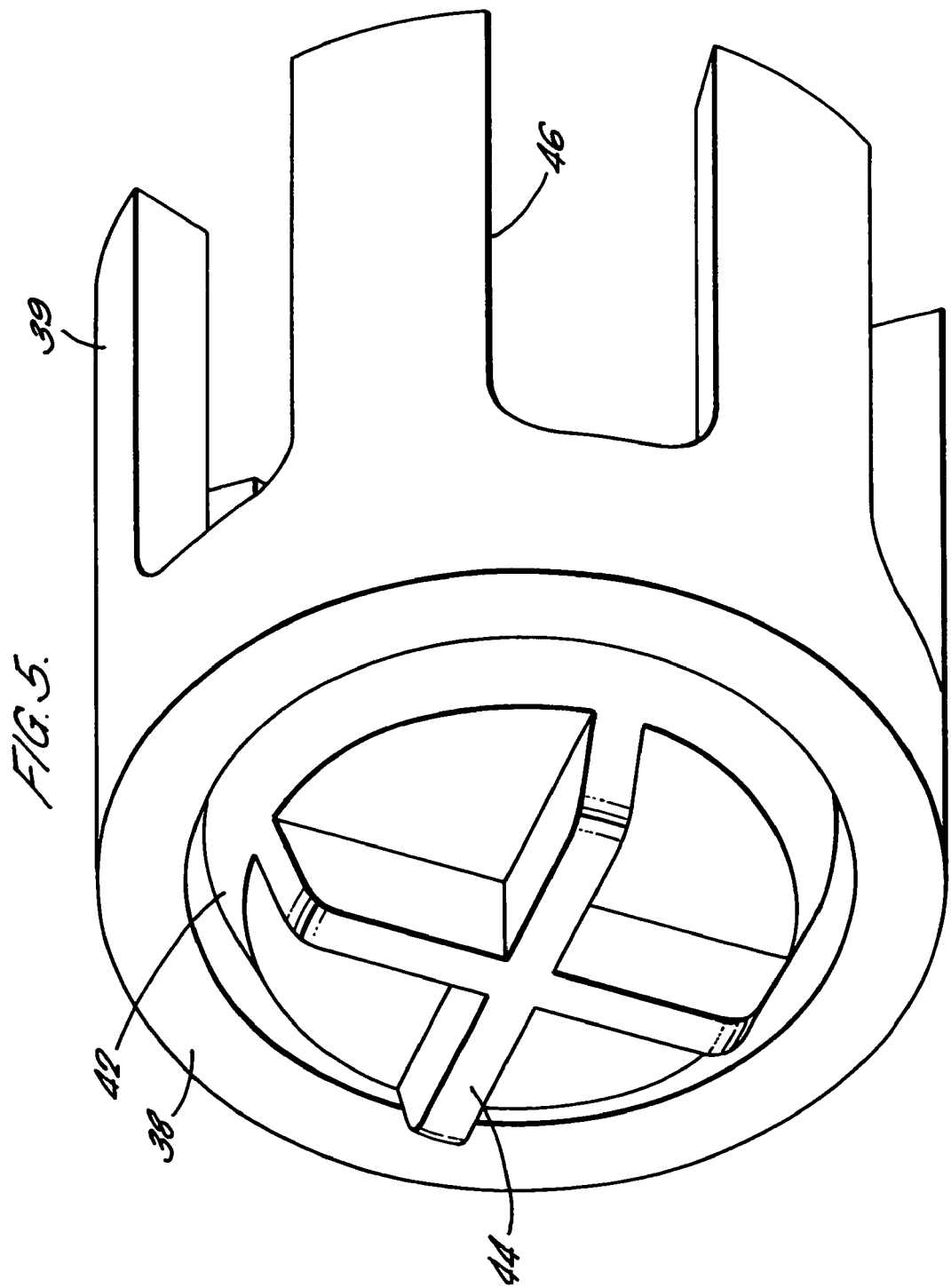
FIG. 5 is an perspective view of the closure device.
Figure 6:
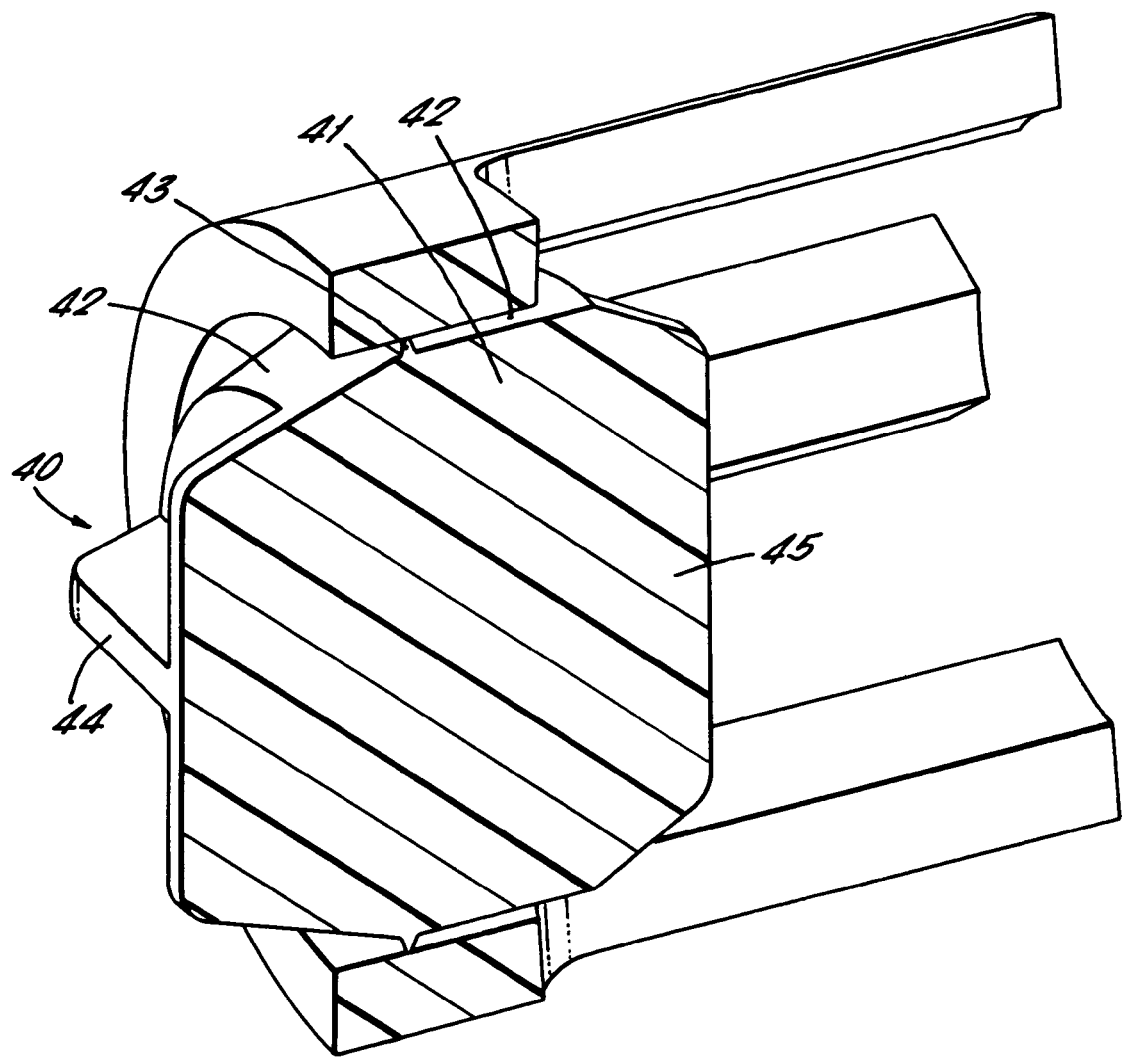
FIG. 6 is a cut-away perspective view of the closing device.

As indicated earlier, the apex of the web 43 connecting the core 40 to the forward portion 43 of the sleeve is rupturable and the cruciform abutment 44 at the front end of the core is designed to be engaged by the leading end of tube portion 30 as the latter is inserted into the connecting body and the raised bead 31 on the tube comes into engagement with the teeth 28 of the collet. On pressing the tube further into the socket of the coupling body, the end of tube forces the core 35 rearwardly breaking the connection of the core to the sleeve and driving the core into the rear part of the sleeve where fluid flow around the core can take place via the slots 46 in the sleeve. At the same time the raised bead 31 snaps past the tube 28 which then engage on the rearward side of the bead to hold the tube in the socket shown in FIG. 2.

The sleeve and collet are conveniently moulded in one piece in plastics material with the web formed integrally with the core and also integrally with the sleeve as described earlier. A modification of that arrangement, the core and sleeve may be moulded as separately components with the web being formed integrally with the core and the core can be secured and placed in the front portion of the sleeve by adhering the apex of the web with the sleeve which again provides as rupturable connection. In a further modification, the web on the core projects into a annular slot in the sleeve which holds the web and prevents flow past the core. An excess force to the core will, however, force the core along the sleeve thus disengaging the web from the slot.

In a further modification, the closure device may comprise the core and the front portion of the sleeve, the rear portion being omitted.

The tube coupling may be supplied with a "stuffer pin" formed integrally with the core to position the core in the coupling. The "stuffer pin" can be used to press the core through the sleeve to open the coupling for flow. The stuffer pin is designed to snap off the core in tension to allow it to be removed.

The invention claimed is:

1. A temporary closure device for a throughway comprising:

an elongate sleeve to fit in the throughway; and a core located in the sleeve, the core having an annular rupturable connection locating the core in the sleeve to prevent flow of fluids through the sleeve, the annular connection being rupturable by displacing the core axially in the sleeve to allow fluid to flow through the sleeve, and the sleeve having a front portion in which the core is located and a rear portion to which the core may be displaced to allow flow of fluid through the sleeve, the rear portion of the sleeve being formed with one or more axially extending slots in the wall of the sleeve through which fluid may flow when the core is located in the rear of the sleeve.

2. A closure device as claimed in claim 1, wherein the annular rupturable connection is formed by an annular web extending between the core and the sleeve.

3. A closure device as claimed in claim 2, wherein the web is formed integrally with the core and has a rupturable connection with the sleeve.

4. A closure device as claimed in claim 3, wherein the annular web is formed integrally with both the core and the sleeve, the connection between the web and the sleeve being rupturable to permit the core to move axially in the sleeve to allow flow through the sleeve.

5. A closure device as claimed in claim 3, wherein the annular web is bonded to the sleeve and the bond being rupturable to permit the core to move axially in the sleeve to allow flow through the sleeve.

6. A closure device as claimed in claim 3, wherein the throughway in the sleeve has annular abutment means with which the web engages to locate the core in the sleeve and from which the web can be disengaged by pressing the core into the throughway to allow flow of fluid along the throughway.

7. A closure device as claimed in claim 1, wherein a plurality of slots are formed in the rear portion of the sleeve equispaced around the sleeve.

8. A closure device as claimed in claim 1, wherein the core is moulded in the front portion of the sleeve and has an end projecting from the front end of the sleeve with which a tube or other component can act to displace the core into the sleeve to open the passage through the sleeve.

9. A closure device as claimed in claim 8, wherein the projecting end of the core tapers from the integral annular web to the front of the core.

10. A closure device as claimed in claim 8, wherein the front of the core has an integral projecting cruciform shape to receive a tube or other component to displace the core.

11. A closure device as claimed in claim 1, wherein the sleeve and core are moulded plastics components.

12. A tube coupling comprising a coupling body having a throughway open at one end to receive a tube, a locking device in the throughway to engage and secure the tube in the throughway, a seal in the throughway beyond the locking device to engage and seal with the tube when the latter is fully inserted into the throughway and is engaged by the locking device and a closure device located in the throughway beyond the seal to be engaged by the tube as the latter is inserted into the throughway, the closure device incorporating a rupturable seal arranged to be ruptured by full insertion of the tube or pin to permit flow in the throughway.

13. A tube coupling as claimed in claim 12, wherein the closure device comprises a sleeve to be engaged in the throughway and a core located in the sleeve with a rupturable seal extending between the core and the sleeve, the core being engaged by a tube or a pin inserted into the throughway to rupture the seal with the sleeve and displace the core along the sleeve to allow flow through the sleeve.

14. A tube coupling as claimed in claim 12, wherein the closure device comprises a sleeve and a core located in the sleeve, the sleeve having a front portion and a rear portion, the core being located in and supported in the front portion of the sleeve by a thin breakable annular web formed integrally between the core and sleeve to prevent flow of fluids through the sleeve, the core being displaceable into the rear portion of the sleeve and the rear portion of the sleeve having a passage or passages therein to permit flow of fluid past the core when located in the rear portion.

15. A tube coupling as claimed in claim 14, wherein the rear portion of the sleeve is formed with one or more axially extending slots in the wall of the sleeve through which fluid may flow when the core is located in the rear of the sleeve.

16. A tube coupling as claimed in claim 15, wherein a plurality of slots are formed in the rear portion of the sleeve equispaced around the sleeve.

17. A tube coupling as claimed in claim 14, wherein the core is moulded in the front portion of the sleeve and has an end projecting from the front end of the sleeve on which a tube or other component can act to displace the core into the sleeve to open the passage through the sleeve.

18. A tube coupling as claimed in claim 17, wherein the projecting end of the core tapers from the integral annular web to the front of the core.

19. A tube coupling as claimed in claim 18, wherein the front of the core has an integral projecting cruciform shape to receive a tube or other component to displace the core.

* * * * *

UNITED STATES PATENT AND TRADEMARK OFFICE
CERTIFICATE OF CORRECTION

| | |
|---|---|
| PATENT NO. | : 7,082,957 B2 |
| APPLICATION NO. | : 10/688360 |
| DATED | : August 1, 2006 |
| INVENTOR(S) | : John Derek Guest |

Page 1 of 1

It is certified that error appears in the above-identified patent and that said Letters Patent is hereby corrected as shown below:

<u>Title Page</u>
Item 57, Abstract, Line 2, change "comprises" to --comprising--

<u>Column 3</u>
Line 17, remove "my"
Line 56, after "bore" insert --,--
Line 62, change "portion of sleeve 38" to --portion 38 of sleeve 37--

<u>Column 4</u>
Line 14, change "43" to --38--
Line 14, after "sleeve" insert --37--

Signed and Sealed this

Seventh Day of August, 2007

JON W. DUDAS
*Director of the United States Patent and Trademark Office*